Patented Oct. 7, 1930

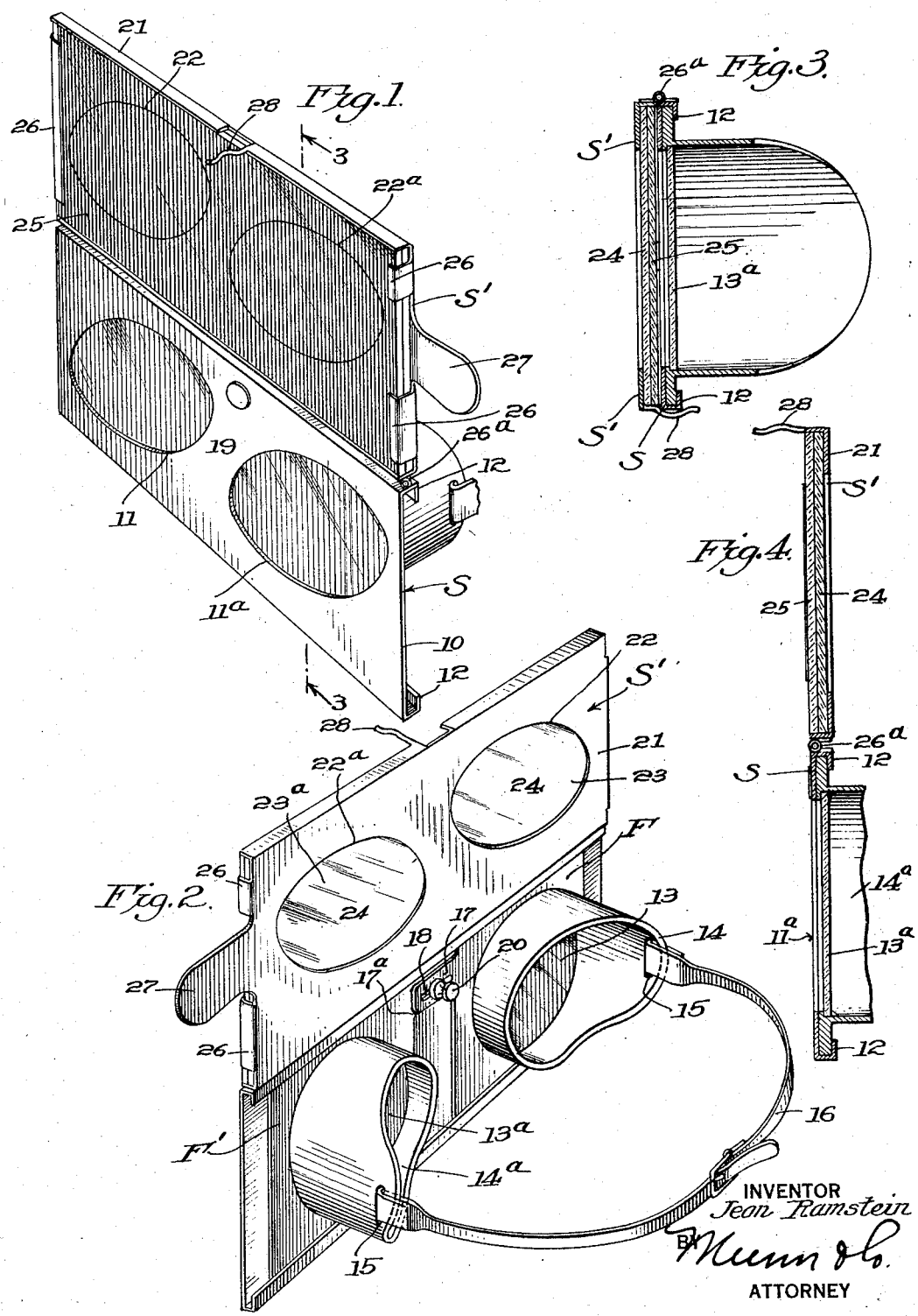

1,777,701

UNITED STATES PATENT OFFICE

JEAN RAMSTEIN, OF LOS ANGELES, CALIFORNIA

EYE PROTECTOR

Application filed April 1, 1929. Serial No. 351,786.

My invention relates to and has for its purpose the provision of an eye protector of simple, substantial and inexpensive construction, particularly adapted, although not necessarily for use in metal welding and cutting operations involving the employment of a torch developing intense heat and light, and by which the intense light of the torch will be rendered sufficiently subdued in its transmission to the eyes of the wearer to produce a darkened condition upon the eyes thoroughly protecting the eyes against injury when the light of the torch is viewed, yet upon a suitable adjustment will permit a sufficiently increased amount of light to be transmitted to the eyes for the work and the surroundings to be clearly viewed without subjecting the eyes to strain and other injurious effects resulting from being suddenly exposed to bright light after being used in weak light, thereby affording maximum protection to the eyes of the wearer.

I will describe only one form of eye protector embodying my invention and will then point out the novel features thereof in claim.

In the accompanying drawing,

Fig. 1 is a perspective view of one form of eye protector embodying my invention, as viewed from the front thereof;

Fig. 2 is a perspective view of the eye protector shown in Fig. 1, as viewed from the rear thereof;

Fig. 3 is a vertical sectional view taken on the line 3—3 of Fig. 1 and illustrating the position of adjustment of the protector for use when welding and cutting with a torch.

Fig. 4 is a vertical sectional view similar to Fig. 3 and illustrating the position of adjustment of the protector for use other than during viewing of the intense light of the torch.

Referring specifically to the drawings in which similar reference characters designate similar parts in each of the several views, my invention in its present embodiment comprises a support designated generally at S and preferably constructed of sheet metal to form a rectangular shaped plate 10 having a pair of spaced apart oval shaped openings 11 and $11^a$ therethrough, and its side edges bent laterally and then inwardly towards each other to form a pair of longitudinal guideways or channels 12 in which the edges of a pair of substantially square frames F and F' are freely received so as to slidably mount the frames on the plate for relative adjustment towards and away from each other. The frames F and F' are provided respectively with circular openings spanned by windows 13 and $13^a$ in the form of transparent glass panels suitably colored or otherwise rendered capable of reducing the intensity of normally bright light to a limited extent in its transmission through the panels. To the frames F and F' are respectively secured in enclosing relation to the windows 13 and $13^a$, hoods 14 and $14^a$ provided with slots 15 through which a suitable head embracing band 16 is adapted to be threaded to attach the band to the hoods, so that the protector can be supported on the head of a person with the hoods fitting against the face around the eyes and thus exclude all light from the eyes except that reaching the eyes through the light subduing windows 13 and $13^a$.

The slidable mounting of the frames F and F' on the support S permits sufficient adjustment of the frames towards and away from each to compensate for variations in the spacing of eyes of different persons; and to secure the frames in any selected position of adjustment, tongues 17 and $17^a$ project from the confronting edges of the frames F and F' respectively in overlying relation, and are provided with registering slots 18 through which extends a headed clamping screw 19. The screw 19 also extends through an opening in the plate 10 and is provided with a suitably knurled nut 20 which when tightened cooperates with the head of the screw 19 to clamp the frames in fixed positions on the plate.

A second support designated generally at S' is also in the form of a rectangular plate 21 having a pair of oval shaped openings 22 and $22^a$ corresponding in spacing to the openings 11 and $11^a$ of the plate 10. Spanning the openings 22 and $22^a$ are windows 23 and $23^a$ respectively, in the form of two transparent panels 24 and 25 preferably of glass, the panels being secured flatwise against each other to the plate 21 by means of lips 26 projecting from the plate and bent over the marginal edges of the outer panel 25. The panel 24 is preferably formed of inexpensive and uncolored glass and functions to protect the panel 25 against damage from incandescent metal particles which might fly about during the welding or cutting operation. The panel 25 is suitably colored or otherwise rendered capable of reducing or subduing the intense light produced by a welding torch, during transmission, through the panels, to such extent as to protect the eyes of the wearer against injury incident to looking directly at the light of the torch, as is necessary during a welding operation.

In the present instance the support S' is hingedly mounted on the support S for swinging movement by means of a suitable hinge 26 along the confronting upper and lower edges of the plates 10 and 21 respectively, to occupy the lowered position shown in Fig. 3 wherein objects can be viewed through the windows 13, 13ᵃ and 23, 23ᵃ so that the eyes of the wearer will be protected against injury when looking directly at the light of the welding torch, or to occupy the raised position shown in Fig. 4 wherein the wearer can clearly view the work and the surroundings through the windows 13 and 13ᵃ exclusive of the windows 23 and 23ᵃ.

The support S' is provided with a handle 27 projecting from one end of the plate 21, and by which the support can be readily swung manually to either of its positions. The support S' is further provided with a spring tongue 28 adapted for latching engagement with the lower edge of the plate 10 to releasably retain the support in its lowered position.

In the use of the eye protector it will be clear that with the latter applied to the head of a person and the support S' latched in its lowered position as shown in Fig. 3, that the eyes of the wearer in viewing the intense light produced by a welding torch, will be protected against injury due to the combined subduing and softening effects of both the panel 25 and the windows 13 and 13ᵃ which permit but a small amount of light to be transmitted to the eyes so as to produce a darkened condition upon the eyes and yet enable the welder to watch the progress of the welding operation.

When it is desired to inspect the work or view the surroundings, the support S' is swung to its raised position shown in Fig. 4, thus removing the panel 25 from in front of the eyes and admitting a sufficiently increased amount of light through the windows 13 and 13ᵃ to permit viewing of objects clearly, yet without subjecting the eyes to the injurious effects of a sudden change from the darkened condition to relatively bright light, as would occur were the panel 25 removed from in front of the eyes and the naked eyes exposed directly to the light.

It will be manifest that broadly, the windows 13 and 13ᵃ constitute a means having such light transmitting charateristics as to sufficiently subdue light of normal intensity in its transmission therethrough to prevent injurious effects upon the eyes which would ordinarily occur as a result of a sudden change from comparative darkness to relatively bright light; that the panel 25 broadly constitutes a means having such light transmitting characteristics as to subdue intense light such as that produced by a welding torch so that injury to the eyes as a result of looking directly at the torch light will be positively prevented; and that the supports S and S' and the hinged connection therebetween constitutes a means by which the panel 25 can be used in conjunction with the windows 13 and 13ᵃ or the latter used separately from the panel 25 according as the welding operation is being performed or it is desired to inspect the work or view the surroundings when not actually welding.

Although I have herein shown and described only one form of eye protector embodying my invention, it is to be understood that various changes and modifications may be made therein without departing from the spirit of the invention and the spirit and scope of the appended claim.

I claim:

An eye protector comprising a plate having a pair of spaced openings therethrough, a pair of window carrying frames slidably mounted on the plate and having the windows thereof registering with said openings, means for securing the frames in fixed positions on the plate, and hoods on the frames surrounding the windows, said means for securing the frames in fixed positions comprising registering slots in the frames and a clamping screw extending through the slots and connected to the plate.

JEAN RAMSTEIN.